H. HOWARD.
Steam Heater.
No. 68,987.
Patented Sept. 17, 1867.
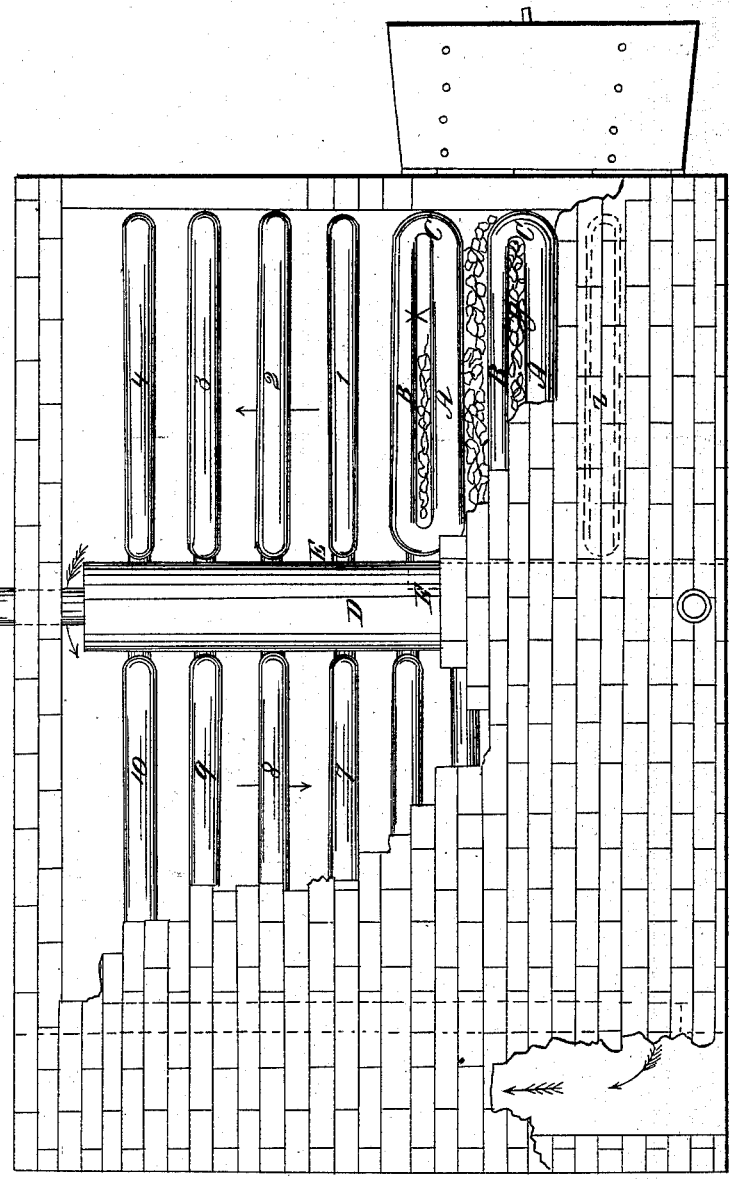
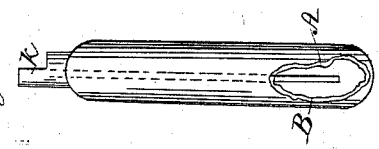

United States Patent Office.

HENRY HOWARD, OF SPRINGFIELD, MASSACHUSETTS.

*Letters Patent No. 68,987, dated September 17, 1867.*

APPARATUS FOR HEATING WATER AND GENERATING STEAM.

*The Schedule referred to in these Letters Patent and making part of the same.*

TO ALL WHOM IT MAY CONCERN:

Be it known that I, HENRY HOWARD, of Springfield, Hampden county, and Commonwealth of Massachusetts, have invented a new and useful improvement in Generators for Heating Water or Generating Steam; and I do hereby declare that the following is a full and exact description thereof, reference being had to the accompanying drawings, and to the letters of reference marked thereon. In these drawings—

Figure 1 represents a side view of my arrangement, and

Figure 2 is a detailed view of one of the parts.

My invention consists in a peculiar form of generator for the purpose of raising water to the proper temperature for heating purposes.

In construction, I arrange a number of pipes or tubes of peculiar form in a manner which I will now describe.

The pipes are placed in such positions that a large amount of heating surface is exposed to the action of the fire, they forming a grate and fire-box and flues, so that the fire and heated air pass over and around them, heating them thoroughly. The arrangement for fire-box, flues, &c., is fully shown in the drawings, the tubes $x \, x \, y$ forming the sides, one of which is shown, and the tubes $z$, shown in dotted lines, forming the grate or bottom of the fire-box. The flues are formed by the tubes 1, 2, 3, 4, &c., in connection with the brick-work, it being immaterial whether they are surrounded by this brick-work entirely or placed closely enough together to form the sides themselves. These tubes are themselves constructed in two parts, A and B, united at one end, C, and entering the reservoir of water D at the other end E. One of these parts A of the tubular generator is much longer than the other, B, and the mouth of the generator being divided, so as to form an entrance and exit from the reservoir, a constant circulation is kept up by the unequal expansion of the water in the tubes A and B, caused by the inequality of the surface exposed to the heat of the fire. In order that the current may be more perfect, I extend the mouth of one of these pipes further into the reservoir D than the other, thus separating the entrance and exit of the water through its course as much as possible. This is shown in fig. 2 at K.

In this manner I form a generator which has not only the advantage of a large amount of exposed heating surface, but also a complete circulation of the water being heated, so that the temperature is raised much more quickly and evenly than would be the case where the water is still.

These tubes may be, if desired, formed by a longitudinal partition through a single cylinder, as shown in fig. 2, and the number and length of these tubes may be indefinitely increased, as may be convenient. As these are formed of continuous piping, with only one joint where they enter the reservoir, there is no danger of leakage or disconnection from the unequal expansion and contraction of the pipes, as is frequently caused by the action of heat on them.

Now, having described my invention, what I claim as new, and desire to secure by Letters Patent, is—

1. An apparatus for heating water or generating steam, consisting of one or more double tubes A and B, constructed as described, and combined with a water-reservoir, substantially as and for the purpose set forth.

2. Arranging these tubes in such a manner as to form a grate and fire-box and flues for the passage of the flames and heated air.

HENRY HOWARD.

Witnesses:
EDWARD H. HYDE,
J. B. GARDINER.